(No Model.)

R. CREASER.
MACHINE FOR DRESSING FLOUR, MIDDLINGS, SEMOLINA, GRAIN, SEEDS, &c.

No. 483,542. Patented Oct. 4, 1892.

WITNESSES:

INVENTOR
Robert Creaser
BY Richardson
ATTORNEYS

UNITED STATES PATENT OFFICE.

ROBERT CREASER, OF MARYBOROUGH, AUSTRALIA.

MACHINE FOR DRESSING FLOUR, MIDDLINGS, SEMOLINA, GRAIN, SEEDS, &c.

SPECIFICATION forming part of Letters Patent No. 483,542, dated October 4, 1892.

Application filed April 20, 1892. Serial No. 429,907. (No model.) Patented in New South Wales November 3, 1891, No. 3,370, and in South Australia November 6, 1891, No. 2,081.

*To all whom it may concern:*

Be it known that I, ROBERT CREASER, of Maryborough, in the Colony of Queensland, Australia, have invented a new and Improved Machine for Separating or Dressing Flour, Middlings, Semolina, Grain, Seeds, or other Dry Granular or Pulverulent Substances, of which the following is a full, clear, and exact description.

The invention has been patented by me in New South Wales, No. 3,370, dated November 3, 1891, and in South Australia, No. 2,081, dated November 6, 1891.

My invention consists in an improved apparatus for dressing flour, grain, middlings, semolina, seeds, or other dry granular or pulverulent substances and is explained as follows, together with the accompanying drawings.

The letters of reference apply to corresponding parts in all figures.

Figure 1:
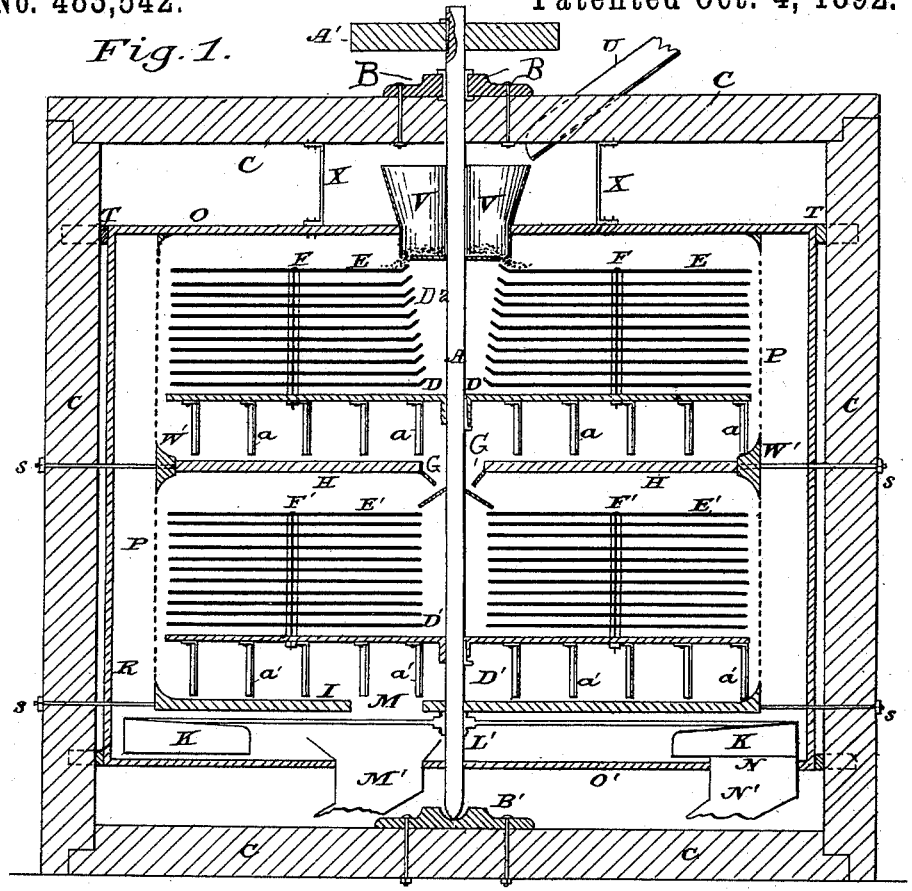
Figure 2:
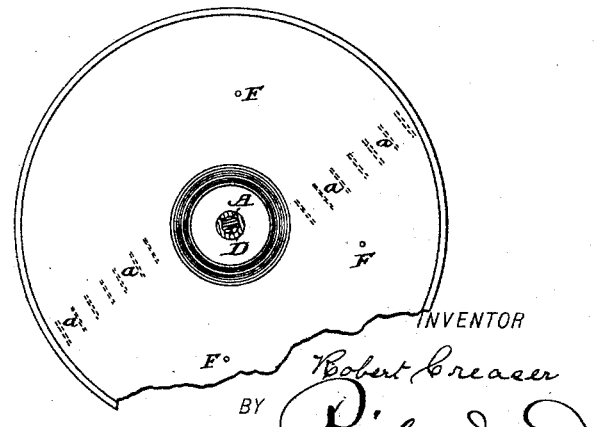
Figure 3:
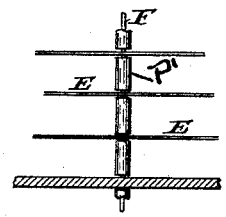

Figure 1 is a sectional elevation, and Fig. 2 a ground plan; Fig. 3, a detail view showing the manner of connecting the disks E and their intermediate spacing ferrules.

A is a spindle, about one and one-half inches diameter, running through the center of the machine; A', driving-pulley keyed to spindle; B, brass-bushed collar bolted or otherwise secured to framework; B', footstep bolted or otherwise secured to framework in which the spindle A revolves; C, framework mortised or bolted together, made out of about three inches by three inches wood or of iron of suitable section and strength; D and D', disks of wood or metal, of which there may be any number, keyed onto the spindle, as shown, or secured thereto by any other suitable means, to which are fixed at an oblique angle to the spindle paddles a and a', preferably of sheet or plate iron, about two and three-fourths inches long by two inches wide, the ends being turned over at right angles for bolting or otherwise fastening the same to the under side of the disks D and D'; E and E', series of disks, of which there may be one or more series, of metal or wood held together and connected to the disks D and D' by bolts and nuts F and F', running through same from the upper side of the top disk to the under side of the bottom disk, four bolts in each series of disks being necessary to insure rigidity. The heads of the bolts are countersunk flush in the top disk.

The disks in E and E' series are kept at equal distances apart by ferrules, as shown in detail, Fig. 1. In both series of disks the space between each may be regulated to suit the kind of substance to be treated by employing ferrules of different lengths, and any number of disks may also be used. There are holes in the center of each disk, excepting in the bottom or base disk, of necessary diameter gradually decreasing in size in each successive disk from the top to the lower one. The edges of these holes in the E series may be slightly turned up, as shown at $D^2$, or may be flat and vertical one to the other, same as E' series. With this exception both series of disks are similar.

H is a receiving-table, of wood or metal, with beveled wood or angle-iron at outside edge for fixing screen P and securing table to framework by bolts S, as shown in Fig. 1. In the center of this table is a hole large enough for the insertion of the spindle A and the passage of the material after manipulation to the series of disks E'. Immediately below, the hole in the center of the table is bushed or collared so as to form a short tube.

I is a receiving-table secured by bolts S to framework C in similar manner to table H, with hole in center only sufficiently large to take the spindle A around, which fits it closely. Four or more bolts are necessary to firmly secure the tables H and I; G, outlet or opening in receiving-table H to series of disks E'.

L are arms secured to the spindle A with set-screws or by other suitable means, and K wooden or metal paddles screwed or otherwise fastened to the arms L; P, screen of silk, woven wire, perforated zinc, or any other suitable covering, according to the material operated upon and fixed at any suitable distance from the periphery of the disks; R, outside case, close fitting, of wood, iron, or any other suitable material to prevent the escape of dust and fixed at any distance from screen P; O and O', top and bottom casing of machine, the top casing being supported by brackets X, secured to the framing and casing, as shown in Fig. 1; T, lugs or brackets secured to casing and framework for maintaining machine in position; U, chute or spout for feeding machine; V, hopper.

M shows opening in receiving-table I, through which the material operated upon is discharged, falling into the chute M', fixed on one side of the spindle A.

N shows opening in the bottom casing O', through which the material collected by the paddles K is discharged, falling into the chute N'.

I wish it to be understood that I do not confine myself to any particular size nor to any particular kind of material for construction.

I now describe the process of working: The flour, grain, or other material is fed onto series of disks E and disk D through the hopper V by means of chute U. The holes in the center of disks E, being largest in the top disk and gradually decreasing in size to the lower one, provide for an equal distribution of material to the surface of each disk, each layer of material getting thinner as it reaches the periphery of each disk, the centrifugal action of the disks when run at a peripheral speed of from one thousand to fifteen hundred feet per minute impels the material in a direct line or at right angles against the cover or screen P, thereby separating or dressing the same. Where more than one series of disks is used, the partly-finished material falls down onto the table H and is propelled by the paddles a to the opening G, where it falls through and is distributed upon the next series of disks E', which again impels it against the screen P in the same manner, as above described in the first series. The material falling on outer edge of table I is propelled by the paddles a' to the opening N and is discharged from the machine by chute M'. The material forced through the screen P, which surrounds the disks, falls upon outer edge of table O' and is propelled by the paddles K to the opening N and discharged from the machine by the chute N'.

Having thus fully described my invention, I claim as new and desire to secure by Letters Patent—

1. In a device of the character herein described, the combination of the hopper V, the spindle A, the disks D D', the paddles a a', having an end turned at right angles and secured to the disks D D', the disks E E', the tables H and I, the openings G, M, and N, and the chutes M' and N', substantially as described.

2. In a device of the character herein described, the combination of the spindle A, the driving-pulley A', means for securing the spindle to the framework C, the casing O O', the disks D D', secured to the spindle, and the paddles a a', having an end turned at right angles and secured to disks D D', substantially as described.

3. In a device of the character herein described, the combination of the spindle A, the disks D D', secured thereto, the disks E E', connected with the disks D D' by bolts and nuts F F', the disks being kept at equal distances by means of ferrules P', and the table H, substantially as described.

4. In a device of the character herein described, the combination of the spindle A, the disks D D', and disks E E', having holes in the center gradually decreased in diameter as they descend, the tables H and I, the screen P, the paddles K, and the chute M'.

ROBERT CREASER.

Witnesses:
  FREDERICK C. EMMOTT,
    *Accountant, Maryborough.*
  THEO. P. BARRYMORE,
    *Articled Clerk, Maryborough.*